(12) United States Patent
Riva et al.

(10) Patent No.: US 11,981,232 B2
(45) Date of Patent: May 14, 2024

(54) TRIM COVER FOR SEAT WITH CUSHION LENGTH ADJUSTER

(71) Applicant: LEAR CORPORATION, Southfield, MI (US)

(72) Inventors: Roberto Riva, Pozzo d'Adda (IT); Armando Pirri, Desio (IT); Marco Miniati, Pozzo d'Adda (IT)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/901,305

(22) Filed: Sep. 1, 2022

(65) Prior Publication Data

US 2024/0075852 A1    Mar. 7, 2024

(51) Int. Cl.
*B60N 2/02*      (2006.01)
*B60N 2/70*      (2006.01)
*A47C 1/023*     (2006.01)

(52) U.S. Cl.
CPC .......... *B60N 2/0284* (2013.01); *B60N 2/7035* (2013.01); *A47C 1/023* (2013.01)

(58) Field of Classification Search
CPC ..... A47C 1/023; B60N 2/0284; B60N 2/7035
See application file for complete search history.

(56) References Cited

U.S. PATENT DOCUMENTS

| | | | |
|---|---|---|---|
| 9,039,085 B2 * | 5/2015 | Aselage | B60N 2/0284 |
| | | | 297/284.3 |
| 9,421,885 B2 * | 8/2016 | Wiegelmann | B60N 2/0284 |
| 9,616,776 B1 * | 4/2017 | Kondrad | B60N 2/02246 |
| 9,809,138 B2 | 11/2017 | Fuwa et al. | |
| 10,449,878 B2 * | 10/2019 | Sala | B60N 2/0224 |
| 10,471,851 B2 | 11/2019 | Ioppolo et al. | |
| 11,059,407 B2 * | 7/2021 | Tait | B60N 2/0284 |
| 11,325,509 B2 * | 5/2022 | Panchani | B60N 2/0284 |
| 2023/0129527 A1 * | 4/2023 | Kimbara | B60N 2/0284 |
| | | | 297/284.1 |

FOREIGN PATENT DOCUMENTS

EP            3763560 A1 *    1/2021        B60N 2/0284

* cited by examiner

*Primary Examiner* — Syed A Islam
(74) *Attorney, Agent, or Firm* — Brooks Kushman P.C.

(57) ABSTRACT

A seat includes a cushion comprising a foam body and a trim cover disposed thereon, the trim cover having a forward portion at a front of the cushion and at least one elastic band attached to the forward portion; and a movable cushion length adjuster having an extended position and a retracted position, the movable length adjuster comprising a body with an occupant surface on a first side, and features on a second side, opposite to the first side. The at least one elastic band is routed on the features, and in the retracted position, the movable cushion length adjuster at least partially covers a portion of the cushion, and in the extended position, the length adjuster is spaced apart from the portion such that the at least one elastic band tensions the trim cover by pulling on the forward portion.

20 Claims, 4 Drawing Sheets

TRIM COVER FOR SEAT WITH CUSHION LENGTH ADJUSTER

TECHNICAL FIELD

The present disclosure is related to a seat assembly, and more particularly, a trim cover for a seat assembly with a seat cushion length adjuster.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, except where otherwise expressly indicated, all numerical quantities in this description and in the claims are to be understood as modified by the word "about" in describing the broader scope of this invention. The term "substantially," "generally," or "about" may be used herein and may modify a value or relative characteristic disclosed or claimed. In such instances, "substantially," "generally," or "about" may signify that the value or relative characteristic it modifies is within ±0%, 0.1%, 0.5%, 1%, 2%, 3%, 4%, 5% or 10% of the value or relative characteristic. Practice within the numerical limits stated is generally preferred. Also, unless expressly stated to the contrary, the description of a group or class of materials by suitable or preferred for a given purpose in connection with the invention implies that mixtures of any two or more members of the group or class may be equally suitable or preferred.

According to one or more embodiments, a seat assembly includes a seat cushion length adjuster cooperable with the seat assembly for extending the length of the seat bottom for occupant comfort. As such, the seat cushion length adjuster has a retracted position where a rear edge of the seat cushion length adjuster is flush with a flush edge of the seat bottom, and an extended position where the rear edge of the seat cushion length adjuster is spaced apart and forward of the flush edge. The seat bottom includes a trim cover with elastic members at a forward portion of the trim cover, positioned under the seat cushion length adjuster in both the retracted and extended positions. The seat cushion length adjuster is trimmed independent of the seat bottom, and includes features on a routing plate bottom side of the seat cushion length adjuster to cooperate with the elastic members to tension the trim cover when the seat cushion length adjuster moves from the retracted position to the extended position.

Figure 1:
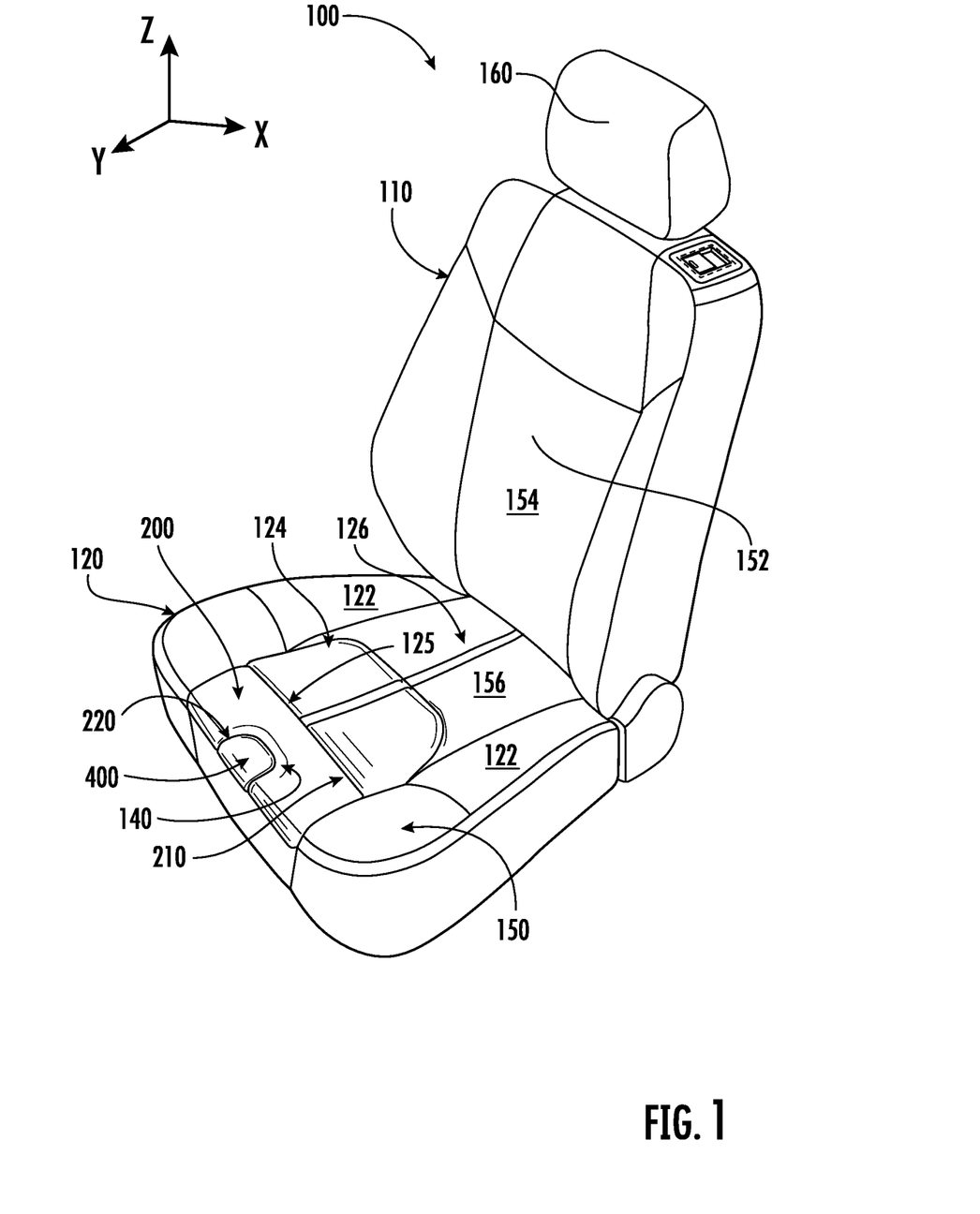
FIG. 1 is a perspective illustration of a vehicle seat, according to at least one embodiment.

Referring now to the figures, where like numerals are used to designate like structure throughout to the drawings, a schematic vehicle seat assembly in accordance with at least one embodiment of the present disclosure is generally shown at by seat assembly 100 in FIG. 1.

FIG. 1 illustrates a perspective view of a seat assembly 100. The seat assembly 100 is adapted for use in a motor vehicle, such as a car or truck, or may be used in with other seat assemblies including in aircraft, theater seats or any suitable seat assemblies, and the discussion of the seat assembly 100 in a vehicle is not intended to be limiting. While the seat assembly 100 is illustrated in FIG. 1 to be a bucket seat assembly, it should be understood that the principles of the present disclosure are applicable to other types of seat assemblies, such as bench, captain, and other types of seat assemblies.

As shown in FIG. 1, the vehicle seat assembly 100 includes a seatback 110 and a seat bottom 120, connected to form seat assembly 100 for supporting an occupant in the vehicle. The seatback 110 may be pivotally mounted to seat bottom 120. The seat bottom 120 may be mounted on a seat frame (not shown) which can be removably secured to the vehicle floor. In some embodiments, the seatback 110 may include a head restraint 160.

In at least one embodiment, each of the seatback 110 and seat bottom 120 include one or more foam cushions to form the seatback 110 and seat bottom 120. The foam cushion can be conventionally secured to a seat frame (not shown) by any method generally known in the art. Each foam cushion may be one or more foam parts, joined together to form the seat component. For example, the seat bottom 120 foam cushion may include side bolster portions 122, or any other components to meet a desired design. The foam cushions can have any suitable size and be formed from any suitable configuration of components. The seatback foam cushion and the seat bottom foam cushion can independently comprise any suitable comfort foam material such as, but not limited to, a suitable resilient polymer, and can independently be formed in any suitable manner. For example, the foam cushions may be formed of conventional polyurethane foam, soy-based foam, silicone, thermoplastic olefins, thermoplastic urethanes, and/or natural oil-based expanded polyurethanes, soy-based polyurethane, polymer fibers, non-woven polyester pads, latex foams and the like. The foam cushions are formed of any suitable comfort material that provides soft resilience as the seat assembly is deflected during use when an occupant is in a seated position. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574.

The seat assembly 100 also includes trim cover assembly 150 adapted to engage the foam cushions in a covering relationship for each of the seatback 110 and seat bottom 120. The trim cover assembly 150 may be secured to the foam cushions in any suitable manner, such as, but not limited to, by mechanical fasteners or heat forming. The trim cover assembly 150 includes one or more trim covers 152 (e.g., for one or more cushions of the seat component), which may comprise any material commonly known in the art. By way of example, some of the known materials include cloth, fabric, leather, synthetic leather, vinyl, synthetic suede, non-woven fabric, or combinations thereof (fabric-to-fabric, leather-to-leather, fabric-to-leather, leather-to-fabric, etc.), or polymers of sufficient quality and thickness for use in seat trim applications. Polymer trim materials may include a flexible closed cell polymer skin material such as polyvinyl, polyvinyl chloride (PVC), thermoplastic olefin (TPO), or thermoplastic urethane (TPU). Additionally, materials for use as layers of the trim cover 152 may include a foam backing (not shown, but generally known in the art) which may be manufactured from a variety of polymer foam materials. By way of example, the foam backing may be polyethylene, polypropylene, polyurethane, or a polystyrene foam. Optionally, other layers such as a mesh or reinforcing material (not shown, but generally known in the art) such as fiberglass or nylon may be applied to the foam backing or back of the trim cover 152 for increasing strength without increasing rigidity. The trim cover assembly 150 provides an occupant seating surface 154, 156 for the seatback 110, and seat bottom 120, respectively. The occupant seating surface 154, 156 is formed on the A-side of the seat assembly 100, which is the external surface visible to the occupant. It should be understood that the cushion for the seatback 110 can differ from the cushion of the seat bottom 120. Likewise, it should be understood that the trim cover assembly 150 for the seat back 110 can differ from the trim cover assembly 150 for the seat bottom 120.

Figure 2:
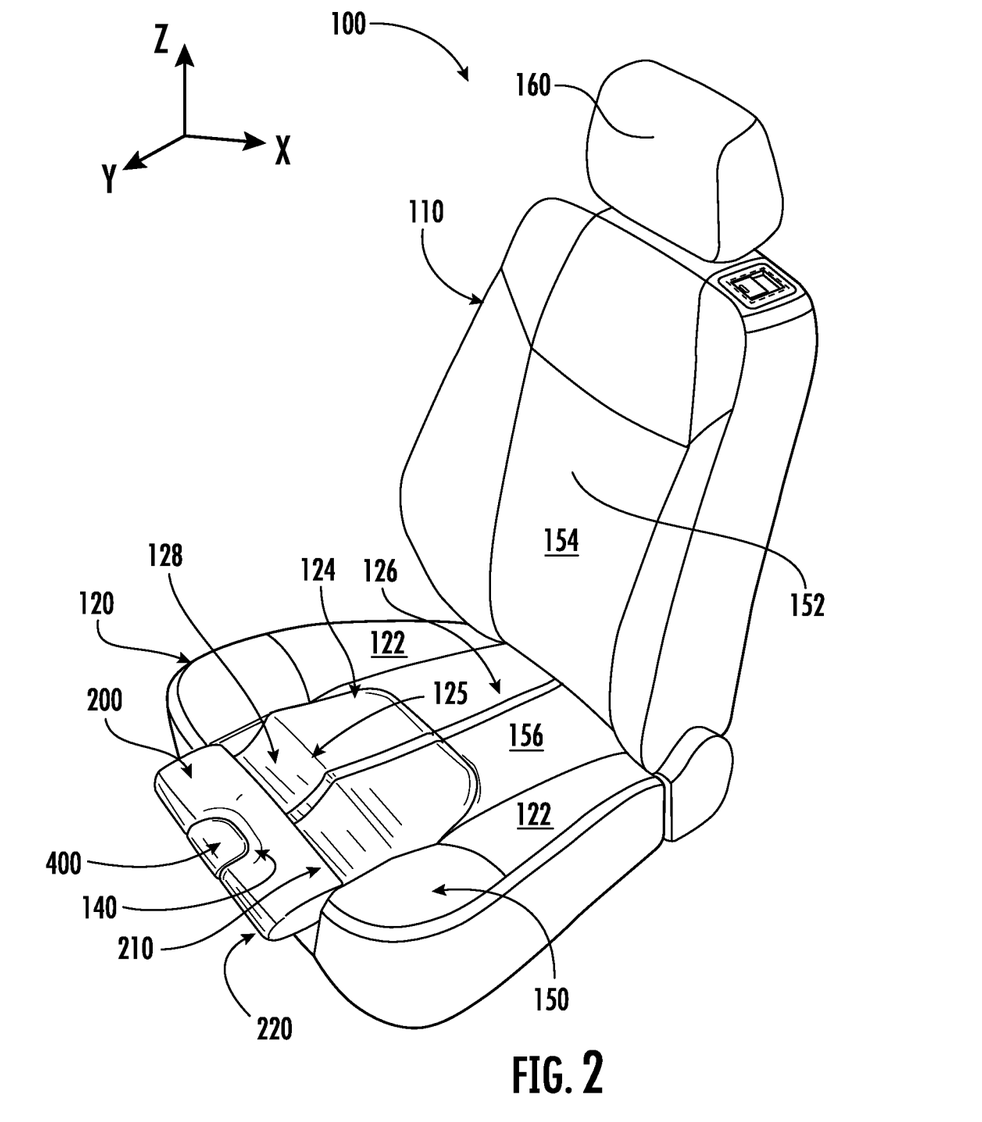
FIG. 2 is a perspective illustration of the vehicle seat of FIG. 1, with the seat cushion length adjuster in an extended position.

Referring again to FIG. 1, the seat bottom 120 includes a cushion defined by side bolsters 122, a center insert 124, and a rear region 126, that cooperate with the trim cover 150 to form the seating surface 156 of the seat bottom 120. The seat bottom 120 further includes a forward region 140 with a seat cushion length adjuster 200 to allow the occupant to move the seat cushion length adjuster 200 to a desired location in the Y-direction to adjust the length of the seat bottom 120. The seat cushion length adjuster 200 is covered by an adjuster trim cover 400 such that the seat cushion length adjuster 200 is separately trimmed. The seat cushion length adjuster 200 has a retracted position (as shown in FIG. 1) and an extended position, as shown in FIG. 2. The seat cushion length adjuster 200 is movable in the Y-direction (or, interchangeably, in the forward and backward direction as defined along the Y-axis) between the retracted position and the extended position. Although shown in a particular extended position, the seat cushion length adjuster 200 may be positioned at any suitable location along the Y-axis based on the extension desired by the occupant, up to a maximum distance as predefined based on the movement mechanism for the seat cushion length adjuster 200. The seat cushion length adjuster 200 may be moved forward toward and to the extended position in any suitable manner, such as, but not limited to, by a motor mechanism, an electronic slide mechanism, manual engagement, or other suitable movement mechanism.

Figure 3A:
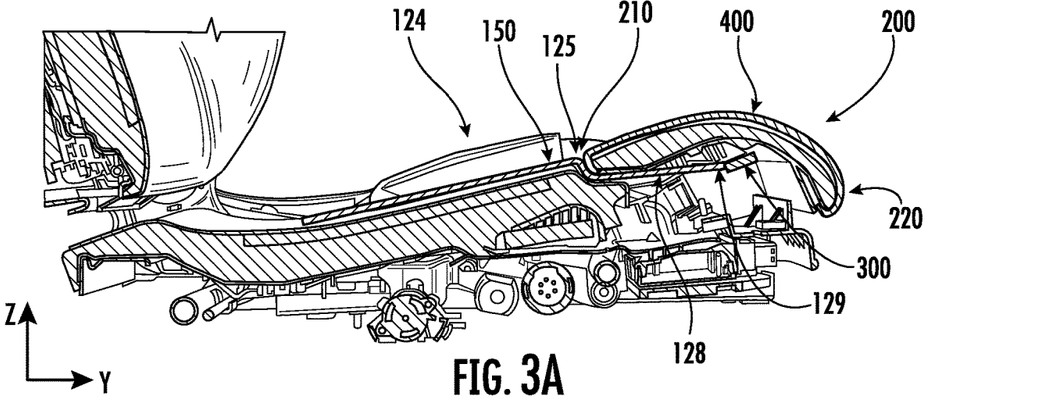
FIG. 3A is a side cross-sectional view taken along 3A of the vehicle seat of FIG. 1.

Referring again to FIG. 1, and as shown in FIG. 3A, in the retracted position, the seat cushion length adjuster 200 has a rear edge 210 that is flush with the flush edge 125 of the center insert 124, such that rear edge 210 is adjacent to the center insert 124. In the retracted position, the seat cushion length adjuster 200 has a forward portion 220 that is flush with forward ends of the side bolsters 122 at the forward region 140.

Figure 3B:
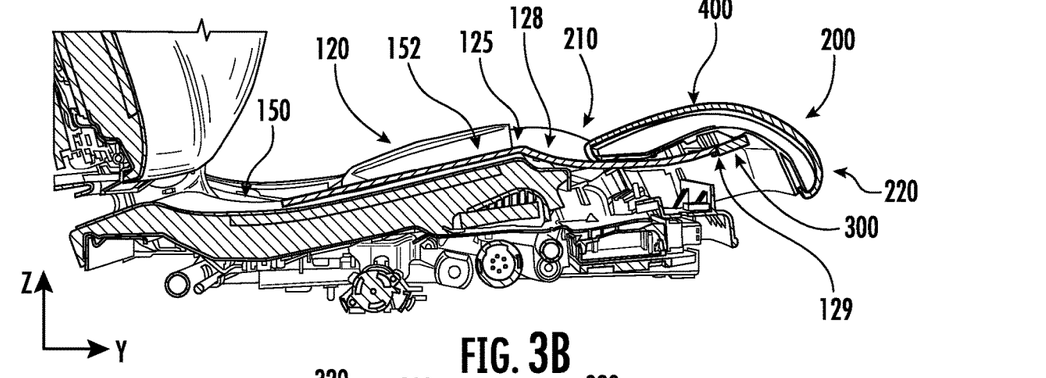
FIG. 3B is a side cross-sectional view taken along 3B of the vehicle seat of FIG. 2.

Referring to FIG. 2, and as shown in FIG. 3B, the seat cushion length adjuster 200 is shown in the extended position, where the seat cushion length adjuster 200 has been moved in the forward direction to elongate the occupant support surface 156 for occupant comfort. The seat cushion length adjuster 200 is movable from the retracted position such that the rear edge 210 is moved forward and spaced apart from the flush edge 125 of the center insert 124. Upon movement of the seat cushion length adjuster 200, as the rear edge 210 moves forward, the seat cushion length adjuster 200 exposes an inset region 128 of the center insert 124 of the seat bottom 120, forward of the flush edge 125 and inset with respect to the flush edge 125 along the Z-direction, and the forward edge 220 of the seat cushion length adjuster 200 is spaced apart from and forward of (in the Y-direction) of the front ends of the side bolsters 122.

With reference to FIGS. 3A-B, side cross-sectional views of the seat assembly 100 of FIGS. 1 and 2, respectively, are shown with the seat cushion length adjuster 200 in the retracted position (FIG. 3A) and in the extended position (FIG. 3B). As shown in FIG. 3A, when the seat cushion length adjuster 200 is in the retracted position, with the rear edge 210 of the seat cushion length adjuster flush with the insert flush edge 125 of the center insert 124, the seat cushion length adjuster 200 is positioned over a portion of the cushion, shown as over a portion of center insert 124 (i.e., the inset region 128 of center insert 124). The seat cushion length adjuster 200 includes features 235 on the bottom side 202 of the seat cushion length adjuster 200. In at least one embodiment, the features 235 are formed on a routing plate 230 on the bottom side 202. The bottom side 202 with the routing plate 230 is opposite to surface of the seat cushion length adjuster 200 with trim cover 400 that cooperates with the trim cover 150 to form the occupant support surface 156. Although discussed hereinafter with reference to a routing plate 230, the features may be formed on the bottom side 202 in any suitable manner, and the inclusion of a routing plate 230 is not intended to be limiting, and is described hereinafter as an example for forming the features 235.

Elastic bands 300 (or interchangeably, elastic members) are routed on the features 235 of the seat cushion length adjuster 200, with the elastic bands 300 being attached to the trim cover 152 at an inset edge 129 (or, interchangeably, forward portion 129 of the trim cover) of the inset region 128 of the trim cover 152 over the seat bottom 120. The inset edge 129 or the forward portion 129 is the front area of the trim cover 152 that is under the seat cushion length adjuster 200. Although the inset edge 129 and forward portion 129 are used interchangeably, the inset edge 129 is not intended to limit the connection area to the edge, and may be considered interchangeably as the forward portion 129 which is a general region of the trim cover that can be provided with the elastic bands 300 to suitably tension the trim cover 152. As such, the trim cover 152 at the center insert 124 and the inset region 128 is tensioned by the elastic bands 300 connected to the forward portion 129 as the seat cushion length adjuster 200 is moved to the extended position. In one or more embodiments, the elastic bands 300 are held at a first tension in the retracted position, and the elastic bands 300 are held at a second tension in the extended position, with the second tension being greater than the first tension. In both the first tension and second tension, the trim cover 152 is held taut by the elastic bands 300. As such, movement of the seat cushion length adjuster 200 pulls the trim cover 152 by tensioning the elastic bands 300 to maintain the aesthetic of the trim cover assembly 150 on the seat bottom 120. Details of the elastic bands 300 and the routing plate 230 will be described with reference to FIGS. 4-6 below.

Figure 4:
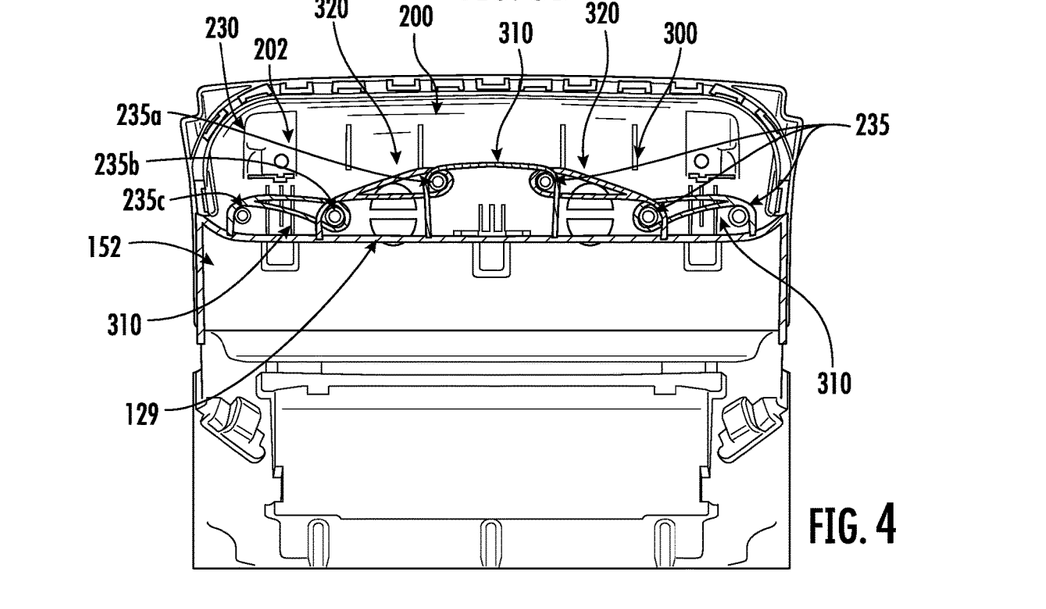
FIG. 4 is a schematic illustration showing the elastic routing for a vehicle seat and a seat cushion length adjuster, according to one or more embodiments.

With reference to FIG. 4, a detailed schematic view of the routing of the elastic bands 300 on the routing plate 230 is shown. As previously provided, the seat cushion length adjuster 200 may include the features 235 on the bottom side 202, and the routing plate 230 may be omitted based on the formation of the features 235, and depiction or discussion of a routing plate 230 is not intended to be limiting. Each of the elastic bands 300 may be any suitable elastic band having a suitable length, tensile strength, and stretchability to maintain tension (without breaking) between the trim cover 152 and the seat cushion length adjuster throughout movement of the seat cushion length adjuster 200 between the retracted position and a maximum extension of the seat cushion length adjuster 200. In some embodiments, the stretchability of the elastic bands 300 may be able to sustain at least the maximum distance of the seat cushion length adjuster 200 extension without breaking, and in further embodiments, may sustain the maximum distance plus 10% to 20% farther. In some embodiments, the elastic band 300 may be a material that lasts the lifetime of the seat cushion length adjuster. Although a specific configuration of routing will be described herein, any suitable pattern, number, or routing of the elastic bands 300 is contemplated as based on the shape of the trim cover 152 at the inset edge 129 and/or the shape or location of the features 235 on the routing plate 230 of the seat cushion length adjuster to evenly tension the trim cover 152 upon movement of the seat cushion length adjuster 200. As such, in at least one embodiment, one or more elastic bands 300 is attached to the trim cover 152 at the inset edge 129, and routed on the bottom side 202 of the seat cushion length adjuster 200. In an embodiment, as shown in FIG. 4, 5 elastic bands 300 are shown. In other embodiments, any number of elastic bands may be used, such as but not limited to, 1 to 20 elastic bands, 1 to 15 elastic bands, or 1 to 10 elastic bands.

In FIG. 4, the inset edge 129 is shown schematically under the seat cushion length adjuster 200 in the retracted position, with the bottom side 202 of the seat cushion length adjuster 200 including features 235 for routing the elastic bands 300 thereon. Although shown as protrusions or posts, the bottom side 202 may include any suitable feature (e.g., a hook or clip) formed on the bottom side 202 engageable with the elastic bands 300 to route and tension the elastic bands 300 when the seat cushion length adjuster 200 is moved between the retracted position and extended position. Furthermore, although 6 features 235 are shown on the routing plate 230, any suitable pattern or number of features 235 may be included as based on the desired number of elastic bands 300 and/or based on routing to evenly tension the inset edge 129 of the trim cover 152. For example, in other embodiments, 1 to 50 features may be used, 1 to 40 features, or 1 to 30 features. The number of features may also be selected based on the number of elastic bands 300 and the specific routing desired to evenly pull the trim cover 152.

In at least one embodiment, the elastic bands 300 include external bands 310 on opposing sides of the inset edge 129 towards the side bolsters 122, which cooperate to evenly tension the trim cover 152. In one or more embodiments, or in further embodiments, the elastic elements 300 include median bands 320 on opposing sides of the inset edge 129, and located inward of the external bands 310, which cooperate to evenly tension the trim cover 152 (and cooperate with the external bands 310 in embodiments with both). In at least one embodiment, or in yet further embodiments, the elastic bands 300 include a central band 330 at the central region of the inset edge 129 to tension the trim cover 152 at the central region (and cooperates with the external bands 310 and median bands 320 in embodiments with one or both of the external bands 310 and median bands 320). The elastic bands 300 are routed on the features 235 to tension the elastic bands and provide even pulling of the inset edge 129 to keep the trim cover 152 taut as the seat cushion length adjuster 200 moves between the retracted and extended positions.

In one or more embodiments, as shown in FIG. 4, the external bands 310 and the median bands 320 each have both ends of the elastic bands 300 attached together to the inset edge 129 to form a loop to engage the routing plate 230 (i.e., at the features 230 formed on the routing plate 230) of the seat cushion length adjuster 200 such that the external bands 310 and the median bands 320 are tensioning the trim cover 152 at the first tension in the retracted position, and at the second tension, greater than the first, in the extended position. In the embodiment shown in FIG. 4, the external bands 310 and medial bands 320 each are first routed around a first post 235a and a second post 235b, respectively, of the features 235 which forms an inflection point for the elastic bands 300, and the loops are secured around the second post 235b and a third post 235c, respectively, of the features 235 to hold the elastic bands 300 on the routing plate 230. In certain embodiments, as shown in FIG. 4, the first posts 235*a* may be outward of the second posts 235*b*, and the second posts 235*b* may be outward of the third posts 235*c*, such that the elastic bands 300 inflect inward to evenly tension the trim cover 152 along the inset edge 129.

In one or more embodiments, as shown in FIG. 4, the central band 330 is attached at a first end of the central band 330 at a first location along the inset edge 129, and at a second end of the central band 330, opposite to the first end, at a second location along the inset edge 129, spaced apart from the first location, such that the central band 330 forms an opening for stretching the central band 330 over the features 235 in the routing plate. In at least one embodiment, the first location and second locations are evenly distanced from a center point along the inset edge. The opening of the central band 330 is routed over the third posts 235*c* of the features 235 such that the central band 330 forms a generally U-shape to tension the trim cover 152. Although the opening is shown as routed on two posts (i.e., third posts 235*c*), the central band 330 may be routed on any number of features 235 to evenly tension the trim cover, and as such, the routing of the opening on the features 235 may form, in other embodiments, other shapes based on the number of features 235 the central band 330 is routed on.

Although the external bands 310 and median bands 320 are described as having both ends of the elastic band 300 secured together at the inset edge 129, and the central band 330 is secured at a first end at a first location and a second end at a second location, the elastic bands 300 may be secured in either manner (together at the inset edge 129 or at spaced apart locations of the inset edge 129) as based on the desired routing pattern of the elastic bands 300. For example, the external bands 310 and/or the median bands may also or alternatively be secured with a first end at a first location and a second end at a second location, spaced apart from the first, and the central band 330 may alternatively be secured with both ends together at the inset edge 129. The securing of both ends together for the external bands 310 and the median bands 330 as shown in the embodiment shown in FIG. 4 allows for the routing for an inflection point at the first posts and second posts, while the opening formed by spacing apart the ends of the elastic bands 300 allows for a U-shaped routing. As such, although shown with external bands 310 and median bands 320 with inflection points, and the central band 330 with an opening, any combination or interchangeability of bands and routing is contemplated such that the trim cover 152 is evenly tensioned when the seat cushion length adjuster 200 is moved between the retracted position and the extended position.

Figure 5:
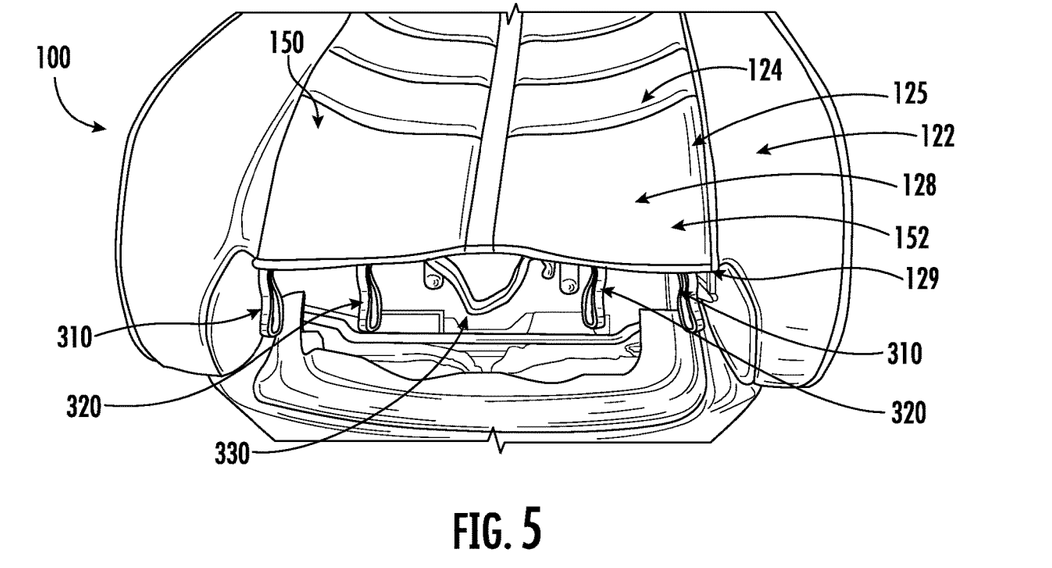
FIG. 5 is a perspective view of a vehicle seat bottom with elastic members, according to at least one embodiment.

With reference to FIG. 5, the attachment of the elastic bands 300 to the trim cover 152 is shown in more detail. The seat bottom 120 is shown with side bolsters 122 and a center insert 124 that cooperate with the trim cover assembly 150 to form the seating surface 156 of the seat bottom 120. The seat bottom 120 further includes the forward region 140 for receiving a seat cushion length adjuster 200 (not shown in FIG. 5) over at least a portion of the center insert 124. The seat bottom 120 includes the trim cover assembly 150 with a trim cover 152 covering the components of the cushion, with the inset edge 129 (or, interchangeably, forward edge of the trim cover 152) shown with the elastic elements 300 connected thereto to tension the trim cover 150 when the seat cushion length adjuster 200 is extended. In certain embodiments, the seat cushion length adjuster 200 is positioned over the inset region 128 such that the inset region 128 is exposed upon movement of the seat cushion length adjuster 200 from the retracted position.

Figure 6:
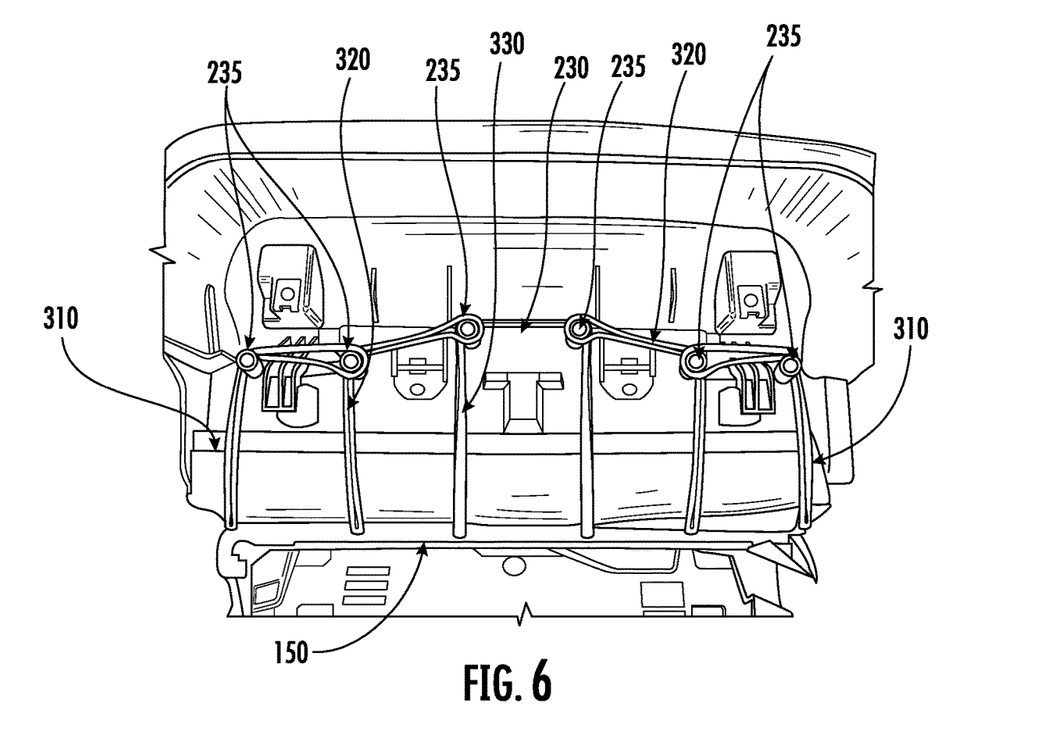
FIG. 6 is a bottom view of the seat cushion length adjuster with the elastic members routed thereon, according to at least one embodiment.

With reference to FIG. 6, the elastic bands 300 are shown routed on the routing plate 230 of the seat cushion length adjuster 300 per the schematic and discussion described with reference to FIG. 4. As shown in FIG. 6, the external bands 310 are routed around the features 235 of the routing plate 230, with first posts 235*a* forming inflection points for the external bands 310, which are anchored at second posts 235*b*. The medial bands 320 are routed around features 235 of the routing plate 230 with 235*b* forming inflection points for the medial bands 320, which are anchored at third posts 235*c*. The central band 330 is anchored at third posts 235*c*, forming a generally U-shape. The routing and anchoring of each of the elastic bands 300 evenly tensions the trim cover 152 at the inset edge 129 while the seat cushion length adjuster 200 is in the retracted position, and keeps the trim cover 152 taut when the seat cushion length adjuster 200 is in the extended position such that the tension is increased from a first tension to a second tension, greater than the first. The increase in tension is based on the position of the seat cushion length adjuster 200 in the Y-direction, with the tension increasing as the seat cushion length adjuster 200 reaches its maximum forward position. As previously discussed, the elastic bands have sufficient stretchability to hold tension without breaking at least up to the maximum forward position, and in at least one embodiment beyond the maximum forward position. Although some elastic bands are shown with one inflection point each, it is further contemplated that the elastic bands may each have more than one inflection point in other embodiments. Additionally, although the elastic bands are shown anchored on one feature, the elastic bands may be anchored (i.e., looped around) more than one feature to further pull the trim cover as opposed to wrapping around as an inflection point. As such, the depicted embodiment is not intended to be limiting.

According to one or more embodiments, a seat assembly includes a seat bottom and a seat cushion length adjuster. The trim cover for the seat bottom includes an inset edge with elastic bands routed on a routing plate on the seat cushion length adjuster to tension the trim cover as the seat cushion length adjuster moves between the retracted position and the extended position. The routing plate includes features for routing the elastic bands thereon, such as for forming inflection points and anchors for the elastic bands. In the retracted position, the elastic bands hold the trim cover at a first tension, and in the extended position, the elastic bands hold the trim cover at a second tension, greater than the first.

Aspect 1. A seat comprises a cushion comprising a foam body and a trim cover disposed thereon, the trim cover having a forward edge at a front of the cushion and at least one elastic band attached to the forward edge; and a movable cushion length adjuster having an extended position and a retracted position, the movable length adjuster comprising a body with an occupant surface on a first side, and a routing plate on a second side, opposite to the first side, the routing plate comprising features, wherein the at least one elastic band is routed on the features, and in the retracted position, the movable cushion length adjuster at least partially covers a portion of the cushion, and in the extended position, the length adjuster is spaced apart from the portion such that the at least one elastic band tensions the trim cover by pulling on the forward edge.

Aspect 2. The aspect 1, wherein each of the at least one elastic band forms a loop.

Aspect 3. The seat of aspect 2, wherein the loop is secured around the features.

Aspect 4. The seat of any of aspects 1 to 3, wherein the at least one elastic band is directed around a first feature of the features and a loop is secured around a second feature of the features.

Aspect 5. The seat of any of aspects 1 to 4, wherein the features are protrusions extending from the routing plate, the protrusions being engageable with the at least one elastic band.

Aspect 6. The seat of any of aspects 1 to 5, wherein the portion is inset with respect to an occupant support surface of the cushion.

Aspect 7. The seat of any of aspects 1 to 6, wherein the trim cover is pulled with a first tension at the forward edge when the movable cushion length adjuster is in the retracted position, and second tension, greater than first tension, when the movable cushion length adjuster is in the extended position.

Aspect 8. The seat of any of aspects 1 to 7, wherein the at least one elastic band includes a pair of outer bands, a pair of inner bands, and a central band.

Aspect 9. The seat of aspect 8, wherein the central band has a first end connected to the trim cover at the forward edge at a first location, and a second end connected to the forward edge at a second location, spaced apart from the first location.

Aspect 10. The seat of aspects 8 or 9, wherein the central band is routed on the features to form a U-shape.

Aspect 11. A seat comprising a cushion comprising a foam body and a first trim cover disposed thereon, the first trim cover having a forward edge at a front of the cushion and an elastic band attached to the forward edge; and a movable cushion length adjuster having an extended position and a retracted position, the movable length adjuster comprising a body with a second trim cover disposed thereon defining an occupant surface, and a routing plate attached on a bottom side of the body, opposite to the occupant surface, the routing plate comprising features, wherein the elastic band is routed on the features, and in the retracted position, the movable cushion length adjuster at least partially covers an inset portion of the cushion, and in the extended position, the length adjuster exposes the inset portion and tensions the elastic band to pull the first trim cover at the forward edge.

Aspect 12. The seat of aspect 11, wherein the elastic band has a first end connected to the forward edge of the first trim cover at a first location, and a second edge connected to the forward edge at a second location to form a loop engageable with the features.

Aspect 13. The seat of aspect 12, wherein the first location and the second location are spaced apart along the forward edge.

Aspect 14. The seat of any of aspects 11 to 13, wherein the elastic band forms a loop, and the elastic band is directed around a first feature of the features and the loop is secured around a second feature of the features.

Aspect 15. The seat of any of aspects 11 to 14, wherein the first trim cover is pulled with a first tension at the forward edge when the movable cushion length adjuster is in the retracted position, and second tension, greater than first tension, when the movable cushion length adjuster is in the extended position.

Aspect 16. A seat comprising a cushion comprising a foam body and a first trim cover disposed thereon, the first trim cover having a forward edge at a front of the cushion, and an elastic band having a first end connected to the forward edge of the trim cover at a first location, and a second end connected to the forward edge at a second location to form a loop; and a movable cushion length adjuster having an extended position and a retracted position, the movable cushion length adjuster comprising a body with a second trim cover disposed thereon defining an occupant surface, and a routing plate attached on a bottom side of the body, opposite to the occupant surface, the routing plate comprising protrusions engageable with the loop, wherein the elastic band is routed on the protrusions, and in the retracted position, the movable length adjuster at least partially covers an inset portion of the cushion, and in the extended position, the length adjuster exposes the inset portion and tensions the elastic band to pull the first trim cover at the forward edge.

Aspect 17. The seat of aspect 16, wherein the first location is spaced apart from the second location.

Aspect 18. The seat of aspects 16 or 17, wherein the first location and the second location are at a same position on the forward edge such that the first end and the second end overlap.

Aspect 19. The seat of aspect 18, further comprising a second elastic band having a first end connected to the forward edge of the trim cover at a first location, and a second edge connected to the forward edge at a second location, spaced apart from the first location.

Aspect 20. The seat of aspect 19, wherein the elastic band is directed around a first protrusion of the protrusions and the loop is secured around a second protrusion of the protrusions, and the second elastic band is routed in a U-shape around a third protrusion and a fourth protrusion of the protrusions.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A seat, comprising:
   a cushion comprising a foam body and a trim cover disposed thereon, the trim cover having a forward portion at a front of the cushion and at least one elastic band attached to the forward portion; and
   a cushion length adjuster that is movable between an extended position and a retracted position, the cushion length adjuster comprising a body with an occupant surface on a first side, and features on a second side, opposite to the first side,
   wherein the at least one elastic band is routed on the features, wherein in the retracted position, the cushion length adjuster at least partially covers a portion of the cushion, and wherein in the extended position, the cushion length adjuster is spaced apart from the portion such that the at least one elastic band tensions the trim cover by pulling on the forward portion.

2. The seat of claim 1, wherein each of the at least one elastic band forms a loop.

3. The seat of claim 2, wherein the loop is secured around the features.

4. The seat of claim 3, wherein the at least one elastic band is directed around a first feature of the features and the loop is secured around a second feature of the features.

5. The seat of claim 1, wherein the features are protrusions extending from a routing plate on the second side, the protrusions engageable with the at least one elastic band.

6. The seat of claim 1, wherein the portion is inset with respect to an occupant support surface of the cushion.

7. The seat of claim 1, wherein the trim cover is pulled with a first tension at the forward portion when the cushion length adjuster is in the retracted position, and the trim cover is pulled with a second tension, that is greater than the first tension, when the cushion length adjuster is in the extended position.

8. The seat of claim 1, wherein the at least one elastic band includes a pair of outer bands, a pair of inner bands, and a central band.

9. The seat of claim 8, wherein the central band has a first end connected to the trim cover at a forward edge of the trim cover at a first location, and a second end connected to the forward edge at a second location, spaced apart from the first location.

10. The seat of claim 9, wherein the central band is routed on the features to form a U-shape.

11. A seat, comprising:
a cushion comprising a foam body and a first trim cover disposed thereon, the first trim cover having a forward portion at a front of the cushion and an elastic band attached to the forward portion; and
a movable cushion length adjuster having an extended position and a retracted position, the movable cushion length adjuster comprising a body with a second trim cover disposed thereon defining an occupant surface, and features on a bottom side of the body, opposite to the occupant surface, wherein the elastic band is routed on the features, wherein in the retracted position, the movable cushion length adjuster at least partially covers an inset portion of the cushion, and wherein in the extended position, the movable cushion length adjuster exposes the inset portion and tensions the elastic band to pull the first trim cover at the forward portion.

12. The seat of claim 11, wherein the elastic band has a first end connected to the forward portion of the first trim cover at a first location, and a second end connected to the forward portion at a second location to form a loop that is engageable with the features.

13. The seat of claim 12, wherein the first location and the second location are spaced apart along the forward portion.

14. The seat of claim 11, wherein the elastic band forms a loop, and the elastic band is directed around a first feature of the features and the loop is secured around a second feature of the features.

15. The seat of claim 11, wherein the first trim cover is pulled with a first tension at the forward portion when the movable cushion length adjuster is in the retracted position, and the first trim cover is pulled with a second tension, that is greater than first tension, when the movable cushion length adjuster is in the extended position.

16. A seat, comprising:
a cushion comprising a foam body and a first trim cover disposed thereon, the first trim cover having a forward portion at a front of the cushion, and an elastic band having a first end connected to the forward portion of the trim cover at a first location, and a second end connected to the forward portion at a second location to form a loop; and
a movable cushion length adjuster having an extended position and a retracted position, the movable cushion length adjuster comprising a body with a second trim cover disposed thereon defining an occupant surface, and a routing plate attached on a bottom side of the body, opposite to the occupant surface, the routing plate comprising protrusions engageable with the loop,
wherein the elastic band is routed on the protrusions, wherein in the retracted position, the movable cushion length adjuster at least partially covers an inset portion of the cushion, and wherein in the extended position, the movable cushion length adjuster exposes the inset portion and tensions the elastic band to pull the first trim cover at the forward portion.

17. The seat of claim 16, wherein the first location is spaced apart from the second location.

18. The seat of claim 16, wherein the first location and the second location are at a same position on the forward portion such that the first end and the second end overlap.

19. The seat of claim 18, further comprising a second elastic band having a first end connected to the forward portion of the trim cover at a first location, and a second end connected to the forward portion at a second location, spaced apart from the first location.

20. The seat of claim 19, wherein the elastic band is directed around a first protrusion of the protrusions and the loop is secured around a second protrusion of the protrusions, and the second elastic band is routed in a U-shape around a third protrusion and a fourth protrusion of the protrusions.

* * * * *